United States Patent [19]
Davis

[11] Patent Number: 5,875,652
[45] Date of Patent: Mar. 2, 1999

[54] MOBILE FOLDABLE STRORAGE CART FOR MUSIC STANDS

[76] Inventor: Douglas D. Davis, 3 Fox Trail Ct., Eldridge, Iowa 52748

[21] Appl. No.: 771,657

[22] Filed: Dec. 23, 1996

[51] Int. Cl.[6] ...................................................... B62B 1/00
[52] U.S. Cl. ........................ 280/651; 211/85.6; 211/162; 280/47.35; 280/79.3
[58] Field of Search .................................. 280/651, 79.3, 280/639, 641, 47.35, 79.11; 211/85.6, 60.1, 126.6, 149, 195, 94.01, 94.02, 162

[56] References Cited

U.S. PATENT DOCUMENTS

| | | | |
|---|---|---|---|
| 2,797,102 | 6/1957 | Adams | 280/641 |
| 4,315,633 | 2/1982 | Boeddeker | 280/79.3 |
| 4,538,829 | 9/1985 | Horowitz | 280/641 |
| 5,495,951 | 3/1996 | Biasini | 280/79.3 |
| 5,738,365 | 4/1998 | McCarthy | 280/79.11 |

*Primary Examiner*—Brian L. Johnson
*Assistant Examiner*—David R. Dunn
*Attorney, Agent, or Firm*—Brady, O'Boyle & Gates

[57] ABSTRACT

A mobile foldable storage cart for music stands wherein a tubular frame assembly is constructed and arranged to form a cart which is foldable to a storage position when not in use. A telescopic rod assembly is provided for maintaining the frame assembly in an erected operative position and for locking the frame assembly in a folded inoperative position. The frame assembly includes inclined, spaced, longitudinally extending rods for slidably receiving a plurality of music stands. A portion of the frame assembly provides a stop to arrest the music stands at the lower end of the inclined, longitudinally extending rods.

14 Claims, 2 Drawing Sheets

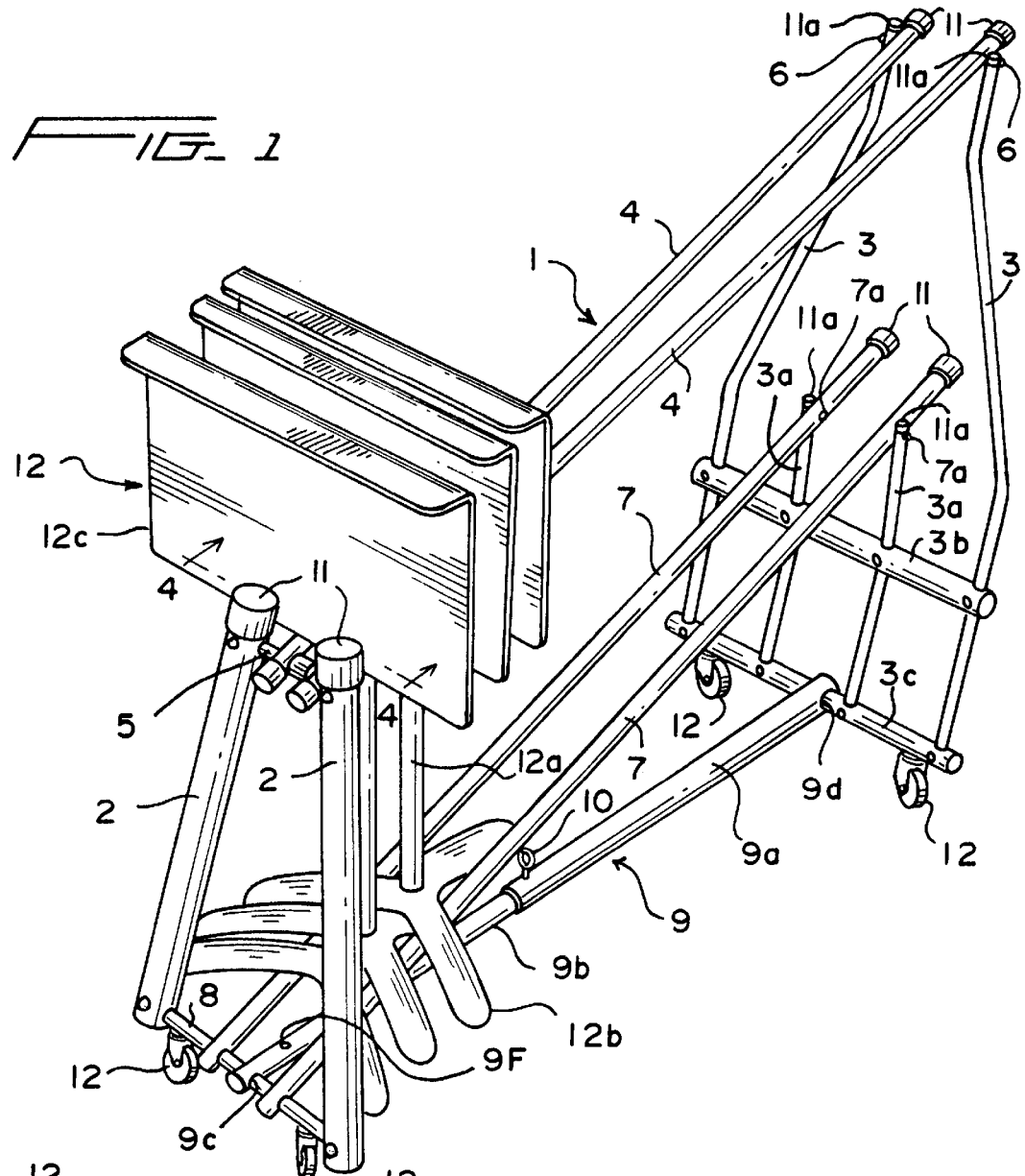
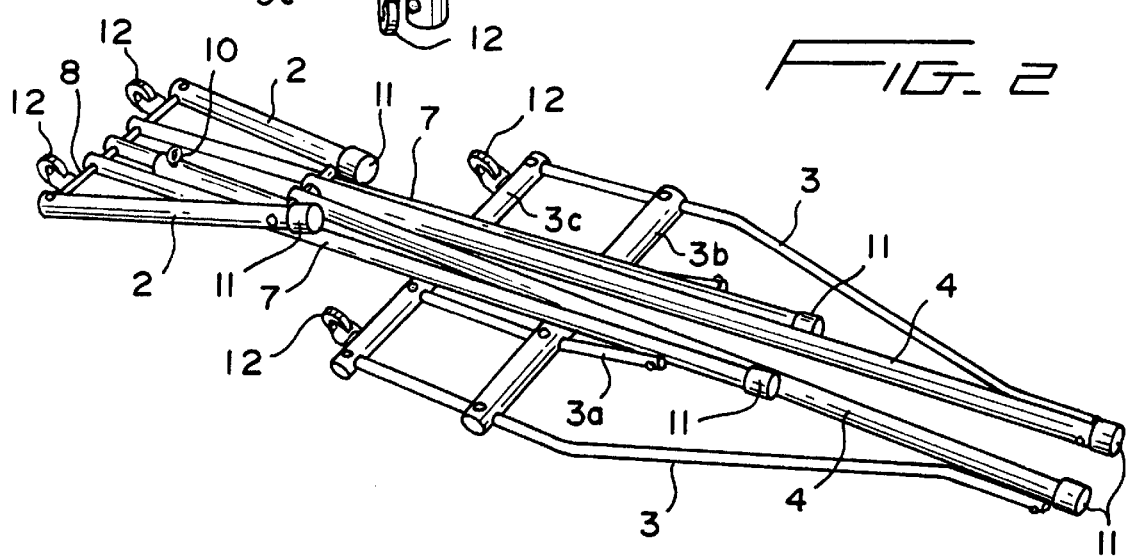

MOBILE FOLDABLE STRORAGE CART FOR MUSIC STANDS

BACKGROUND OF THE INVENTION

Mobile storage carts for music stands are disclosed in U.S. Pat. Nos. 4,315,633 dated Feb. 16, 1982 and 5,495,951 dated Mar. 5, 1996, wherein a frame assembly for supporting a plurality of music stands is provided with castor wheels to render the cart mobile. The frame assembly includes a pair of upper spaced, parallel, longitudinally extending rods and a pair of lower, spaced, parallel, longitudinally extending rods. The lower rods support the base of each music stand, and the column of each stand extends upwardly between the pair of upper rods with the edge of each music desk portion resting on the top surface of the upper rods. In U.S. Pat. No. 4,315,633, the upper and lower rods are inclined rearwardly so that a maximum number of music stands can be stored on a cart dimensioned to move through relatively small doorways. When loading this cart, a music stand column is inserted between the upper rods at the rear of the cart, and the music stand is allowed to slide downwardly toward the front of the cart until it engages a stop member extending between the upper and lower rods at the lower end portions thereof.

While the mobile storage carts disclosed in the above-noted patents have been satisfactory for their intended purpose, they have been characterized by certain disadvantages; namely, while these carts are constructed and arranged to support music stands when not in use, there is no provision for storing the carts while the music stands are in use or when transporting the carts from one location to another.

SUMMARY OF THE INVENTION

After considerable research and experimentation, the mobile storage cart of the present invention has been devised which is an improvement over the above-noted prior art storage carts, and comprises, essentially, a tubular frame assembly having a pair of spaced upwardly extending tubular members at the front of the cart, and a pair of spaced, upwardly extending tubular members at the rear of the cart. A pair of upper, spaced, inclined, downwardly convergent, longitudinally extending tubular rods extend between the front and rear members, and the ends of the rods are pivotally connected to the tubular members. Similarly, a pair of lower, spaced, inclined, longitudinally extending tubular rods are also pivotally connected to the front and rear members. A telescopic rod assembly is positioned below the lower tubular rods and is pivotally connected to the front and rear members. A removable pin extends through the telescopic rod assembly when in the extended position to hold the frame assembly in the erected position. When the pin is removed, the telescopic rod assembly moves to the retracted position allowing the front and rear tubular members to pivot downwardly in a direction toward the rear of the cart, whereby the cart is in the folded or collapsed position. The pin is reinsertable into the telescopic rod assembly for holding the cart in the folded position.

The upper and lower end portions of the front tubular members provide a stop for holding and aligning the music stands supported on the cart.

BRIEF DESCRIPTION OF THE DRAWINGS

FIG. 1 is a perspective view of the storage cart of the present invention in the erected position for storing music stands;

FIG. 2 is a perspective view of the cart in the folded position;

DESCRIPTION OF THE PREFERRED EMBODIMENTS

Figure 3:
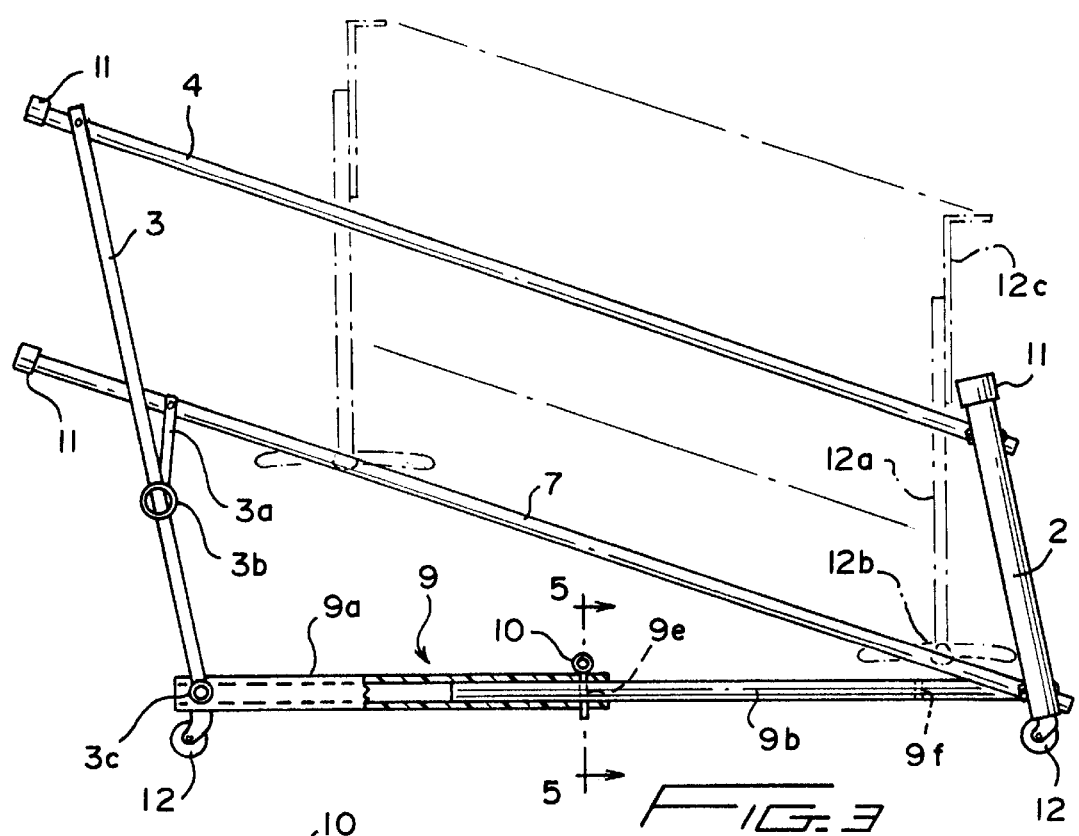
FIG. 3 is a side elevational view, partly in section, showing the cart in the erected position.

Referring to the drawings and, more particularly to FIGS. 1 and 3, the mobile, foldable storage cart of the present invention comprises a tubular frame assembly having a pair of spaced, upwardly extending tubular members 2 positioned at the front of the cart, and a pair of spaced upwardly extending tubular members 3 at the rear of the cart. A pair of upper, spaced, inclined, longitudinally extending tubular rods 4 extend between the tubular members 2 and 3 and are pivotally connected to the upper end portions of the tubular members by pivotal connections 5 and 6. A pair of lower, spaced, inclined, longitudinally extending tubular rods 7 are positioned below the upper rods 4 and are pivotally connected at one end to a transverse arm 8 extending between the lower end portions of the tubular members 2, and at the opposite end by pins 7a to a pair of spaced, parallel, upwardly extending arms 3a integral with a transversely extending tube 3b connected at each end to the tubular members 3.

A longitudinally extending telescopic rod assembly 9 is positioned below the lower rods 7 and comprises a cylinder or sleeve portion 9a and a rod portion 9b slidably received in the sleeve portion 9a. The distal end of the rod 9b is pivotally connected as at 9c to the lower arm 8, and the distal end of the sleeve portion 9a is pivotally connected as at 9d to a transversely extending tube 3c connected at each end to the lower end portions of tubular members 3.

Figure 5:
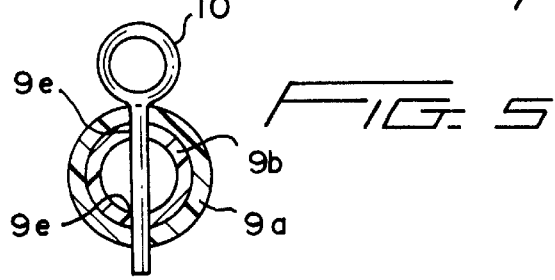
FIG. 5 is a view taken along line 5—5 of FIG. 3.

As will be seen in FIGS. 3 and 5, a removable pin 10 extends transversely through the sleeve 9a and through an aligned aperture 9e in the rod 9b, whereby the telescopic rod assembly 9 is held in the extended position, to thereby maintain the frame assembly in the erected position.

To fold the frame assembly to the collapsed position as shown in FIG. 2, the pin 10 is removed, and the telescopic rod assembly 9 moves to the retracted position wherein the rod 9b slides inwardly of the sleeve 9a. The pin 10 can be reinserted as shown in FIG. 3, to extend through another aligned aperture 9f, provided in the rod 9b, whereby the frame assembly 9 is held in the folded position.

Figure 4:
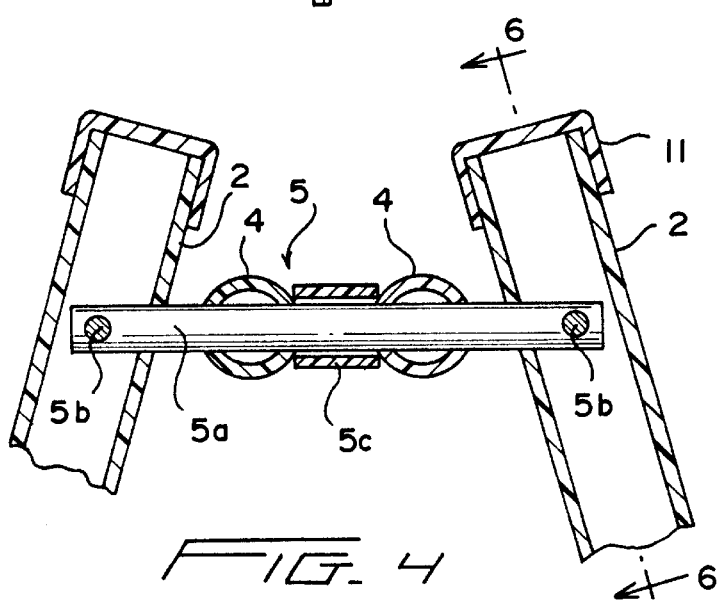
FIG. 4 is a view taken along line 4—4 of FIG. 1.
Figure 6:
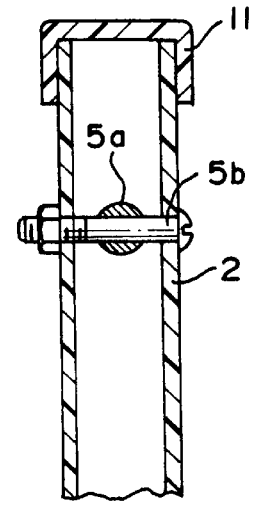
FIG. 6 is a view taken along line 6—6 of FIG. 4.

The details of the construction of the pivotal connection 5 of the upper tubular rods 4 to the tubular members 2 at the front of the cart are illustrated in FIGS. 4 and 6, wherein it will be seen that opposite ends of a transversely extending shaft 5a extend into the tubular members 2 and are secured therein by a pin or bolt assembly 5b extending through the tubular members 2 and shaft 5a. The shaft 5a also extends through the tubular rods 4, and a spacer sleeve 5c interposed the tubular rods 4.

While the tubular members 2, 3; tubular rods 4, 7; and telescopic rod assembly 9 can be fabricated from various light-weight metals, such as aluminum, the preferred material is plastic, such as PVC pipe.

To finish the cart 1, plastic caps 11 can be placed on the exposed extended ends of the tubular members 2 and tubular rods 4 and 7, end plugs 11a are inserted into the exposed ends of tubular members 3 and 3a, and caster wheels 12 are connected to the lower arm 8 at the front of the cart and to the tube 5c at the rear of the cart.

In use, to manipulate the storage cart from the stored position as shown in FIG. 2, to the erected position as shown in FIGS. 1 and 3, the pin 10 is removed from the aperture 9f in the rod 9b of the telescopic rod assembly to thereby release the frame assembly from the folded and locked storage position. The upper portions of the front tubular members 2 are then pulled forwardly causing the tubular members to 2 to pivot in a counterclockwise direction relation to the lower arm 8. The tubular rods 4 and 7, pivotally connected between the front tubular members 2 and rear tubular members 3, function as a connecting linkage assembly resulting in the rear tubular members 3 being pulled upwardly to the erected position. The pin 10 is then inserted into the aperture 9c in the rod 9b for holding the frame assembly in the erected position.

To load a music stand 12 on the cart 1, the music stand column 12a is inserted between the upper tubular rods 4 at the rear of the cart, and the music stand tripod base 12b is supported by the lower rods 7. The music stand 12 is allowed to slide downwardly toward the front of the cart until the desk portion 12c and tripod base 12b engage, respectively, the top and lower end portions of the front tubular members 2, which provide a stop member for the first music stand and the subsequent music stands mounted on the cart.

From the above description, it will be readily appreciated by those skilled in the art that the music stand storage cart of the present invention is an improvement over prior art music stand storage cart in that the storage cart of the present invention can be folded from an erected operative position to a collapsed inoperative position to facilitate the storage of the cart when not in use. The removable pin 10 not only holds the cart in the erected position but also in the stored position, and the upper and lower end portions of the tubular members 2 provide a stop to hold and align the music stands on the cart, thus, precluding the necessity of attaching separate stop members to the cart.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A mobile foldable storage cart for music stands comprising a frame assembly including a first pair of spaced, upwardly extending tubular members positioned at the front of the cart, a second pair of spaced, upwardly extending tubular members positioned at the rear of the cart, a first pair of spaced, longitudinally extending rods extending between said first pair of tubular members and said second pair of tubular members, a second pair of spaced, longitudinally extending rods positioned below said first pair of rods and extending between said first and second pairs of tubular members, means for pivotally connecting each end of said first pair of rods to the upper end portions of the first and second pair of tubular members, means for pivotally connecting each end of said second pair of rods to the lower end portions of the first and second pair of tubular members, and releasable fastener means operatively connected to the first and second pair of tubular members for maintaining the frame assembly in an erected position for supporting a plurality of music stands, said releasable fastening means comprising a telescopic rod assembly, including a sleeve and a rod, one end of said rod being slidably mounted in one end of said sleeve, means for connecting the other end of said rod to the lower end portions of said first pair of tubes, means for connecting the other end of said sleeve to the lower end portions of said second pair of tubes, and a removable pin insertable through said sleeve and a first aligned aperture in said rod for holding the frame assembly in the erected position, said pin being removable from said sleeve and said first aligned aperture when the cart is empty to allow the frame assembly to be folded to the stored position.

2. A mobile foldable storage cart according to claim 1, wherein a second aligned aperture is provided in said rod for receiving the pin extending through said sleeve for locking said frame assembly in the folded position.

3. A mobile foldable storage cart for music stands comprising a frame assembly including a first pair of spaced, upwardly extending tubular members positioned at the front of the cart, a second pair of spaced, upwardly extending tubular members positioned at the rear of the cart, a first pair of spaced, longitudinally extending rods extending between said first pair of tubular members and said second pair of tubular members, a second pair of paced, longitudinally extending rods positioned below said first pair of rods and extending between said first and second pairs of tubular members, said first pair of rods being inclined from the first pair of tubular members to the second pair of tubular members, whereby a music stand having a column connected between a desk portion and a tripod base portion is insertable from the rear of the cart with the music stand column extending through the space between the first pair of rods with the edge of the desk portion supported by said first pair of rods and the base portion supported by said second pair of rods, said music stand being slidable downwardly on said first pair of rods toward the front of the cart, the upper end portions of the first pair of tubular members extending above the lower end portions of the first pair of rods, adapted to engage the desk portion of the music stand and the lower end portions adapted to engage and align the tripod base to thereby provide a stop to prevent the music stand from sliding off the cart, means for pivotally connecting each end of said first pair of rods to the upper end portions of the first and second pair of tubular members, means for pivotally connecting each end of said second pair of rods to the lower end portions of the first and second pair of tubular members, and releasable fastener means operatively connected to the first and second pair of tubular members for maintaining the frame assembly in an erected position for supporting a plurality of music stands, said fastener means being releasable when the cart is empty to allow the frame assembly to be folded to a stored position.

4. A mobile foldable storage cart according to claim 1, wherein the means for pivotally connecting the ends of the first pair of rods to the upper end portions of the first pair of tubular members comprises a transversely extending shaft extending between the upper end portions of said first pair of tubular members, and means for connecting each end of said shaft to a respective tubular member, said shaft extending through the end portions of said first pair of rods.

5. A mobile foldable storage cart according to claim 1, wherein the means for pivotally connecting each end of said second pair of rods to the lower end portion of the first pair of tubular members comprises a transverse arm extending between and connected to the lower end portions of said first pair of tubular members, said arm extending through the end portions of said second pair of rods.

6. A mobile foldable storage cart according to claim 1, wherein the means for pivotally connecting the ends of the first pair of rods to the upper end portions of the second pair of tubular members comprises a pair of pins extending between each tubular member and the end portions of a respective rod.

7. A mobile foldable storage cart for music stands comprising a frame assembly including a first pair of spaced, upwardly extending tubular members positioned at the front of the cart, a second pair of spaced, upwardly extending tubular members positioned at the rear of the cart, a first pair of spaced, longitudinally extending rods extending between said first pair of tubular members and said second pair of tubular members, a second pair of spaced, longitudinally extending rods positioned below said first pair of rods and extending between said first and second pairs of tubular members means, for pivotally connecting each end of said first pair of rods to the upper end portions of the first and second pair of tubular members, means for pivotally connecting each end of said second pair of rods to the lower end portions of the first and second pair of tubular members, the means for pivotally connecting the ends of the second pair of rods to the lower end portions of the second pair of tubular members comprising a transversely extending tube connected at each end to the second pair of tubular members, a pair of upwardly extending arms extending normal to said transversely extending tube, the lower end of each arm being connected to said transversely extending tube, and a pin extending through the upper end of each arm and through an end portion of a respective rod, and releasable fastener means operatively connected to the first and second pair of tubular members for maintaining the frame assembly in an erected position for supporting a plurality of music stands, said fastener means being releasable when the cart is empty to allow the frame assembly to be folded to a stored position.

8. A mobile foldable storage cart according to claim 1, wherein the means for connecting said other end of said rod to the lower end portions of said first pair of tubes comprises a transverse arm extending between and connected to the lower end portions of said first pair of tubular members, said arm extending through said other end of said rod.

9. A mobile foldable storage cart according to claim 1, wherein the means for connecting said other end of said sleeve to the lower end portions of said second pair of tubes comprises a transverse tube extending between and connected to the lower end portions of said second pair of tubular members, said tube extending through said other end of said sleeve.

10. A mobile foldable storage cart according to claim 8, wherein ground engaging wheels are connected to said arm.

11. A mobile foldable storage cart according to claim 9, wherein ground engaging wheels are connected to said transverse tube.

12. A mobile foldable storage cart according to claim 1, wherein the frame assembly is made of plastic pipe.

13. A mobile foldable storage cart according to claim 1, wherein the frame assembly is made of light-weight metal.

14. A mobile foldable storage cart according to claim 3, wherein the first pair of rods are downwardly convergent.

\* \* \* \* \*